United States Patent
Naitoh

(10) Patent No.: US 10,218,862 B2
(45) Date of Patent: Feb. 26, 2019

(54) INFORMATION PROCESSING TERMINAL, IMAGE FORMING APPARATUS, INFORMATION PROCESSING METHOD, AND RECORDING MEDIUM FOR SETTING A HOME SCREEN

(71) Applicant: Hisashi Naitoh, Tokyo (JP)

(72) Inventor: Hisashi Naitoh, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/899,744

(22) Filed: Feb. 20, 2018

(65) Prior Publication Data
US 2018/0278770 A1    Sep. 27, 2018

(30) Foreign Application Priority Data
Mar. 21, 2017   (JP) ................................ 2017-055089

(51) Int. Cl.
| | |
|---|---|
| *G06F 9/451* | (2018.01) |
| *H04N 1/00* | (2006.01) |
| *G06F 3/12* | (2006.01) |
| *H04N 1/44* | (2006.01) |

(52) U.S. Cl.
CPC ....... *H04N 1/00514* (2013.01); *G06F 3/1204* (2013.01); *G06F 3/1288* (2013.01); *G06F 9/453* (2018.02); *H04N 1/00474* (2013.01); *H04N 1/4413* (2013.01); *H04N 2201/0094* (2013.01)

(58) Field of Classification Search
CPC ............. H04N 1/00514; H04N 1/4406; H04N 2201/0094; G06F 3/04842; G06F 9/451
USPC ........ 358/1.9, 1.13, 1.18; 345/173; 715/762, 715/820
See application file for complete search history.

(56) References Cited

U.S. PATENT DOCUMENTS

| | | | | |
|---|---|---|---|---|
| 5,774,713 | A * | 6/1998 | Yokota | G06F 9/451 |
| 2008/0215978 | A1* | 9/2008 | Bamba | G06F 3/0482 715/713 |
| 2013/0160141 | A1* | 6/2013 | Tseng | G06F 21/6245 726/28 |

FOREIGN PATENT DOCUMENTS

| | | |
|---|---|---|
| JP | 2015-165410 | 9/2015 |
| JP | 2016-066258 | 4/2016 |
| JP | 2016-0666281 | 4/2016 |
| JP | 2017-011517 | 1/2017 |
| WO | 2016/208134 | 12/2016 |

* cited by examiner

*Primary Examiner* — Jamares Q Washington
(74) *Attorney, Agent, or Firm* — IPUSA, PLLC

(57) ABSTRACT

An information processing terminal functions as an operator of an image forming apparatus. The information processing terminal includes a display device for displaying a screen; a generator for generating a system home screen; a generator for generating an extended function screen; a display screen setter for setting the screen to be displayed on the operator according to an operation performed with respect to a predetermined icon included in the screen displayed on the display device, wherein the system home screen is set as an initial value; a switcher for switching the set screen; a determiner for determining the set screen according to the operation; and a display controller for displaying, on the display device, the extended function screen together with an icon for displaying the system home screen, upon determining that the extended function screen is set by the display screen setter.

11 Claims, 19 Drawing Sheets

FIG.9

`<meta-data OS:name="jp.co.aaa.isdk.sdkservice.system.enable_homekey_allocation" OS:value="true"/>`

INFORMATION PROCESSING TERMINAL, IMAGE FORMING APPARATUS, INFORMATION PROCESSING METHOD, AND RECORDING MEDIUM FOR SETTING A HOME SCREEN

CROSS-REFERENCE TO RELATED APPLICATION

The present application claims priority under 35 U.S.C. § 119 to Japanese Patent Application No. 2017-055089, filed on Mar. 21, 2017, the contents of which are incorporated herein by reference in their entirety.

BACKGROUND OF THE INVENTION

1. Field of the Invention

The present invention relates to an information processing terminal, an image forming apparatus, an information processing method, and a recording medium.

2. Description of the Related Art

In recent years, the technique for providing a screen customized for each user, in an operation part of an image forming apparatus such as a multifunction peripheral, is already known.

In image forming apparatuses of the related art, there has been a technique for easily customizing user interface (UI) parts (buttons and icons) arranged on a UI screen (operation panel) operated by a user.

SUMMARY OF THE INVENTION

An aspect of the present invention provides an information processing terminal, an image forming apparatus, an information processing method, and a recording medium in which one or more of the disadvantages of the related art are reduced.

According to one aspect of the present invention, there is provided an information processing terminal configured to function as an operation part of an image forming apparatus, the information processing terminal including a display device configured to display a screen; a first screen generator configured to generate a system home screen for a system; a second screen generator configured to generate an extended function screen for an extended function; a display screen setter configured to set the screen to be displayed on the operation part according to an operation performed with respect to a predetermined icon included in the screen displayed on the display device, the display screen setter having the system home screen set as an initial value; a switcher configured to switch the screen set by the display screen setter; a determiner configured to determine the screen set by the display screen setter according to the operation performed with respect to the predetermined icon; and a display controller configured to display, on the display device, the extended function screen together with an icon for displaying the system home screen, upon determining that the extended function screen is set by the display screen setter.

BRIEF DESCRIPTION OF THE DRAWINGS

FIG. 9 is a diagram for describing a setting method of a home key assignable application according to an embodiment of the present invention;

DETAILED DESCRIPTION OF THE PREFERRED EMBODIMENTS

In the related art, for example, as a method of providing a customized screen, there is a method of using a launcher application that provides a home screen, for example. The launcher application is an application that can customize the home screen. However, since the creation method of the launcher application is different from the creation method of regular applications, there is a problem that the development cost is higher than that of regular applications.

Furthermore, when providing a screen customized by the creation method of a regular application, it is not possible to invoke the home screen (display the home screen) by pressing the home button of the operating system (OS) such as Android (registered trademark). "Pressing" also includes touching an icon displayed on a touch panel. Therefore, there has been a problem that a sufficient function of a home screen cannot be provided.

A problem to be solved by an embodiment of the present invention is to provide an image forming apparatus capable of displaying, as a home screen, a screen created by an application other than a launcher application.

Embodiments of the present invention will be described by referring to the accompanying drawings.

<System Configuration>

Figure 1:
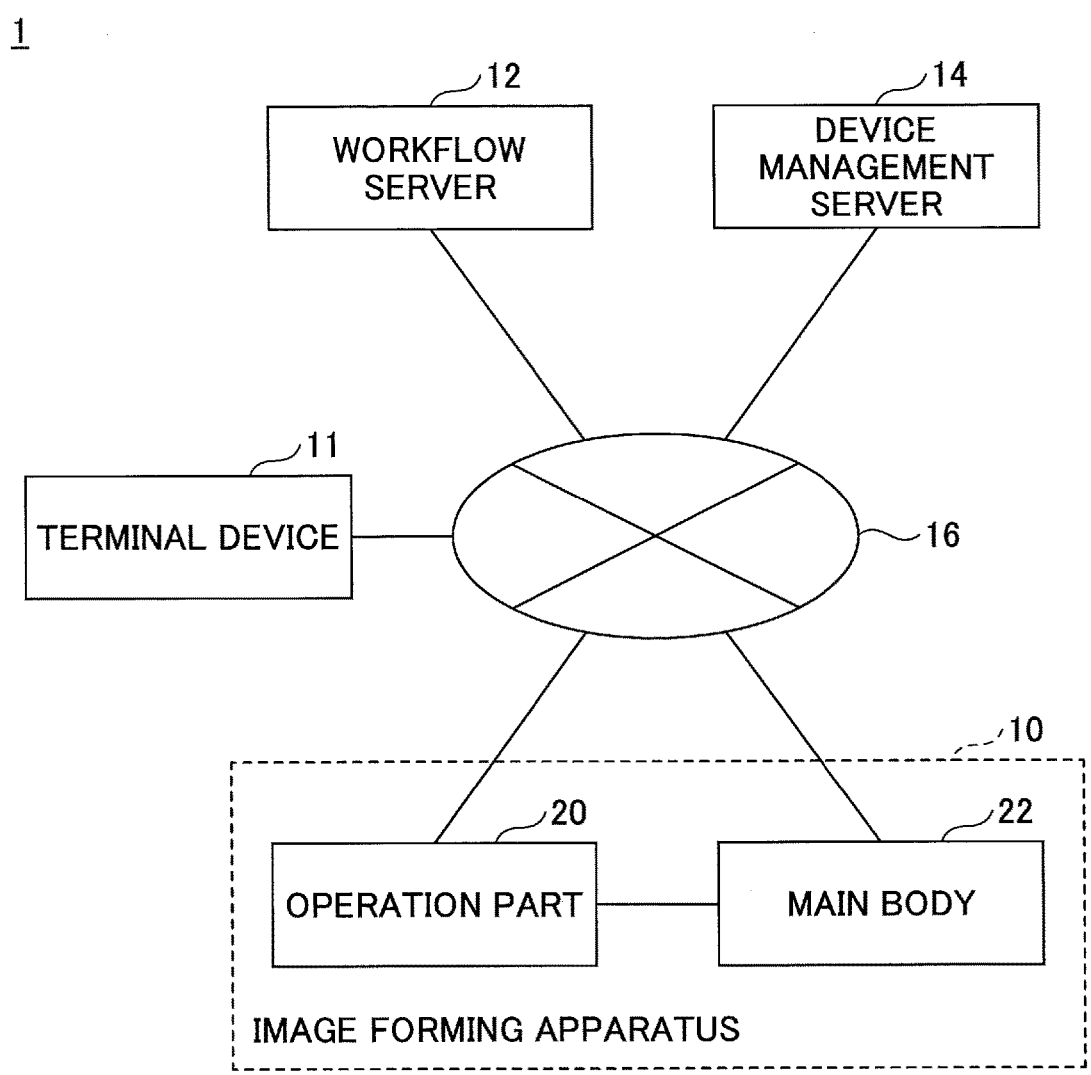
FIG. 1 is a configuration diagram of an example of an information processing system according to an embodiment of the present invention.

FIG. 1 is a configuration diagram of an example of an information processing system according to the present embodiment. In an information processing system 1 illustrated in FIG. 1, an image forming apparatus 10, a terminal device 11, a workflow server 12, and a device management server 14 are communicably connected via a network 16 such as the Internet.

The image forming apparatus 10 includes an operation part 20 and a main body 22. The image forming apparatus 10 is an example of a device including the operation part 20, and is a device such as a multifunction peripheral, a printer, a scanner, and a facsimile machine, etc. The terminal device 11 is a device that can be operated by a user, such as a desktop personal computer (PC), a notebook PC, a smartphone, a mobile phone, and a tablet PC, etc.

The workflow server 12 is a server device that operates a workflow application. For example, the workflow server 12 provides a function of customizing a home screen. Furthermore, the device management server 14 manages devices such as the image forming apparatus 10, and provides functions such as remote home key assignment. A home key is one kind of an icon.

The configuration of the information processing system 1 in FIG. 1 is merely an example, and other configurations may be used. For example, a plurality of the image forming apparatuses 10 may be provided. The information processing system 1 according to the present embodiment realizes a mechanism in which a user authentication function of the image forming apparatus 10 and an application for creating screens to cooperate with each other, to easily provide a home screen customized for each user.

<Hardware Configuration>

Figure 2:
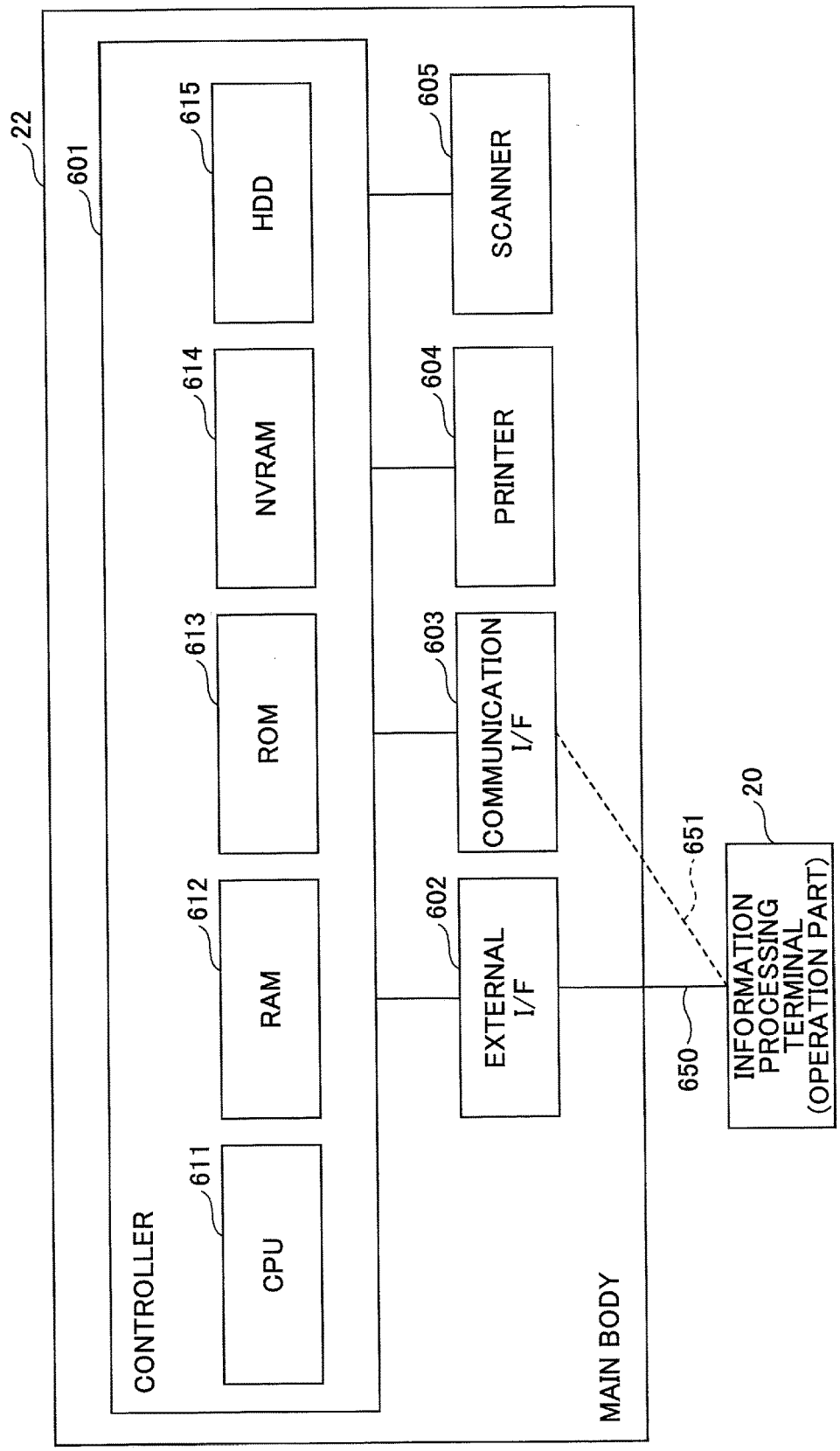
FIG. 2 is a hardware block diagram of an example of an image forming apparatus according to an embodiment of the present invention.

A hardware configuration of the image forming apparatus 10 according to the present embodiment will be described with reference to FIG. 2. FIG. 2 is a hardware block diagram of an example of the image forming apparatus 10 according to the present embodiment. Although the image forming apparatus 10 of FIG. 2 is a multifunction peripheral (MFP) as an example, the image forming apparatus 10 is not limited to a multifunction peripheral. A multifunction peripheral is a device including a plurality of functions such as a print function, a scanner function, and a copy function, etc.

The image forming apparatus 10 illustrated in FIG. 2 has a configuration including the operation part 20 and the main body 22. The operation part 20 can be implemented by an information processing terminal, etc., having a function of accepting a user's operation. A user's operation includes, for example, giving an instruction by touching an icon or a keyboard displayed on a touch panel, and giving an instruction by moving a cursor to a predetermined icon and clicking the predetermined icon. The information processing terminal is a terminal such as a tablet terminal, for example. The main body 22 implements various functions such as a print function, a scanner function, and a copy function.

The operation part 20 and the main body 22 are communicably connected via a communication path 650. For example, the communication path 650 of a Universal Serial Bus (USB) standard may be used. The operation part 20 and the main body 22 may use a communication path 651 based on short-range wireless communication such as Local Area Network (LAN) or Bluetooth (registered trademark), for example. Note that the image forming apparatus 10 of FIG. 2 can also be regarded as an image forming system including an information processing terminal and the main body 22.

The main body 22 includes a controller 601, an external interface (I/F) 602, a communication I/F 603, a printer 604, and a scanner 605, etc. The controller 601 includes a central processing unit (CPU) 611, a random access memory (RAM) 612, a read-only memory (ROM) 613, a non-volatile RAM (NVRAM) 614, and a hard disk drive (HDD) 615, etc. The ROM 613 stores various programs and data. The RAM 612 temporarily holds programs and data. For example, setting information, etc., is stored in the NVRAM 614. Furthermore, various programs and data are stored in the HDD 615.

The CPU 611 loads programs, data, and setting information, etc., from the ROM 613, the NVRAM 614, and the HDD 615, etc., into the RAM 612, and executes processes, thereby controlling the operations of the entire main body 22 and implementing various functions.

The external I/F 602 is an interface for communicating with the operation part 20 via the communication path 650. The communication I/F 603 is an interface for connecting the main body 22 to the operation part 20 and the network 16.

The printer 604 is a printing device for printing print data on a conveyed object. For example, the conveyed object is not limited to paper; other examples are coated paper, thick paper, an overhead projector (OHP) film, a plastic film, prepreg, and copper foil, etc. The scanner 605 is a reading device for reading image data (electronic data) from an original document and generating an image file (electronic file).

Figure 3:
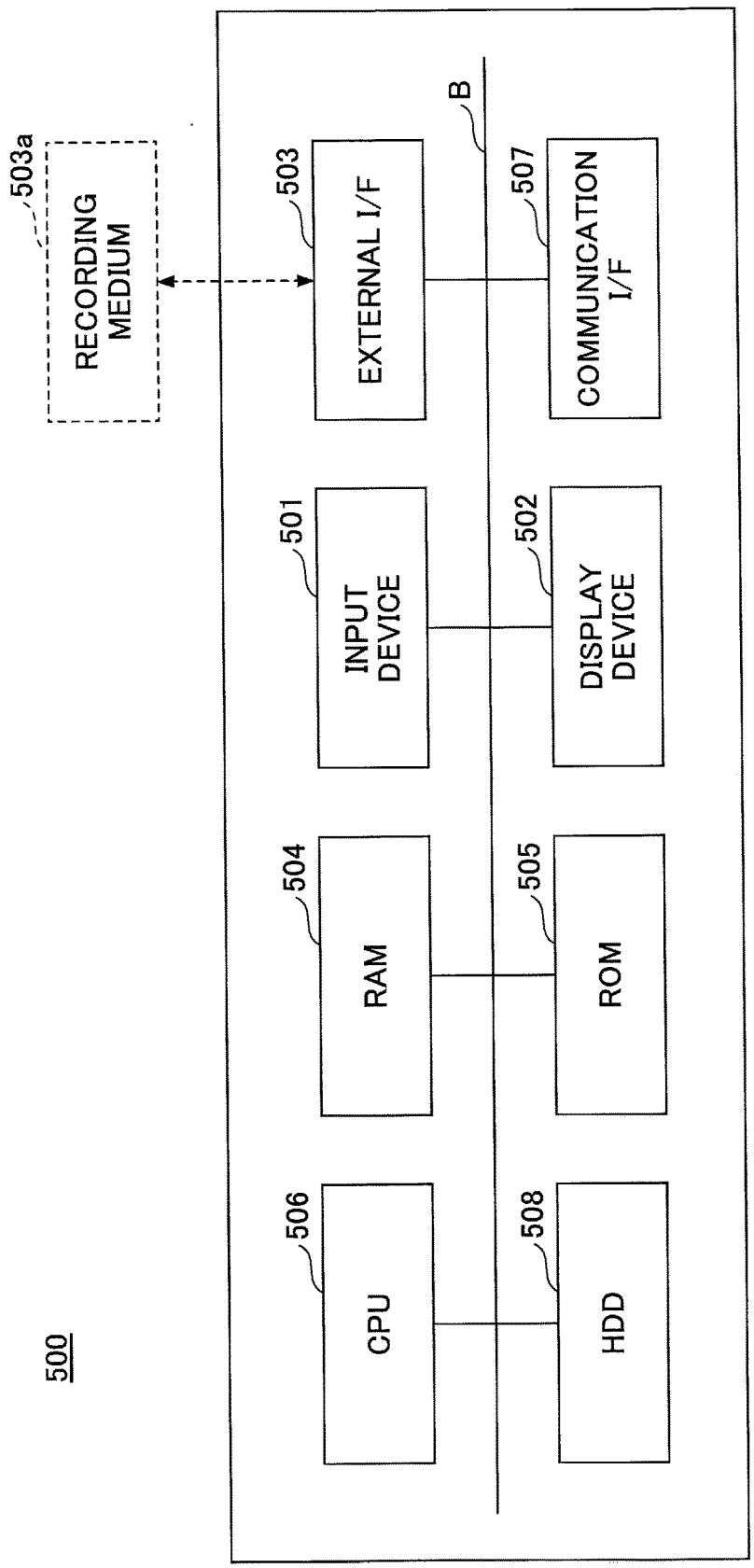
FIG. 3 is a hardware block diagram of an example of a computer according to an embodiment of the present invention.

The information processing terminal functioning as the operation part 20, and the workflow server 12 and the device management server 14 of FIG. 1, are implemented by, for example, a computer having the hardware configuration illustrated in FIG. 3. FIG. 3 is a hardware block diagram of an example of a computer according to the present embodiment.

A computer 500 in FIG. 3 includes an input device 501, a display device 502, an external I/F 503, a RAM 504, a ROM 505, a CPU 506, a communication I/F 507, and an HDD 508, etc., which are interconnected via a bus B.

The input device 501 includes a touch panel and hardware keys, etc., and is used by a user to input operation signals. The display device 502 is formed by a liquid crystal display (LCD), etc., and displays information. The communication I/F 507 is an interface for connecting the computer 500 to the main body 22 and various networks.

Furthermore, the HDD 508 is an example of a nonvolatile storage device that stores programs and data. The stored programs and data include an operating system (OS) that is basic software for controlling the entire computer, and applications that provide various functions on the OS. Instead of the HDD 508, the computer 500 may use a drive device (for example, solid state drive (SSD)) using a flash memory as a storage medium.

The external I/F 503 is an interface with respect to the main body 22 and a recording medium 503a. Accordingly, the computer 500 can read and/or write data in the recording medium 503a via the external I/F 503. The recording medium 503a may be a flexible disk, a compact disc (CD), a digital versatile disk (DVD), an secure digital (SD) memory card, and a USB memory, etc.

The ROM 505 is an example of a nonvolatile semiconductor memory (storage device) that can hold programs and data even after the power is turned off. The ROM 505 stores programs and data such as a Basic Input/Output System (BIOS), OS settings, and network settings, etc., which are executed when the computer 500 is activated. The RAM 504 is an example of a volatile semiconductor memory (storage device) that temporarily holds programs and data.

The CPU 506 is an arithmetic device that implements control and functions of the entire computer 500 by loading programs and data from a storage device such as the ROM 505 and the HDD 508 into the RAM 504, and executing processes. The computer 500 functions as an input unit that accepts input from the user and a display unit that displays information, by the hardware configuration as illustrated in FIG. 3.

<Software Configuration>

Figure 4:
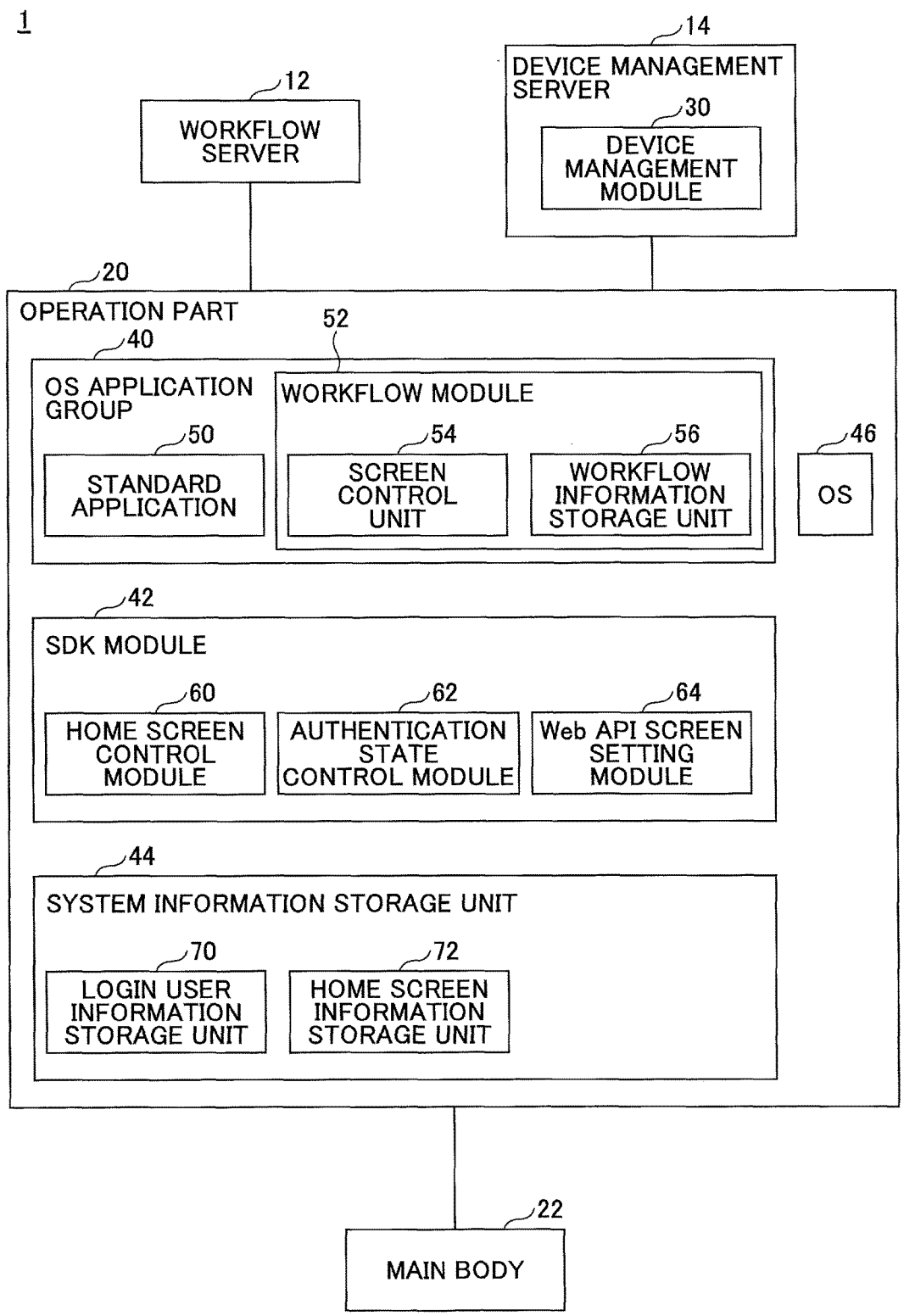
FIG. 4 is a software block diagram of an example of the information processing system according to an embodiment of the present invention.

Next, the functional configuration of the information processing system 1 according to the present embodiment will be described. FIG. 4 is a software block diagram of an example of the information processing system 1 according to the present embodiment. The workflow server 12 includes a management tool unit and a workflow information storage unit for storing settings of workflows and home screens, etc.

The management tool unit of the workflow server 12 is a user interface (UI) module that makes settings of workflows and makes settings of systems, etc. The management tool unit distributes a function of customizing a home screen and the settings of the home screen, to a workflow module to be described later. The device management server 14 also includes a device management module 30. The device management module 30 is a module that manages the image forming apparatus 10 and provides functions such as remote home key assignment.

The operation part 20 of the image forming apparatus 10 has a configuration including an OS application group 40, a Software Development Kit (SDK) module 42, a system information storage unit 44, and an OS 46. The OS 46 is an operating system such as Android (registered trademark). The OS application group 40 includes applications that run on the OS 46. The OS application group 40 includes a standard application 50 and a workflow module 52 as an extended function application.

The workflow module 52 includes a screen control unit 54 and a workflow information storage unit 56. The workflow module 52 provides a home screen. The screen control unit 54 is a module for controlling the display of the home screen of the workflow module 52. The workflow information storage unit 56 holds a synchronized workflow and settings of the home screen from the management tool.

The SDK module 42 is a group of platform modules for using various functions such as authentication and the screen of the image forming apparatus 10. A home screen control module 60 is a module for controlling the home screen of the operation part 20. The home screen control module 60 makes settings for the home key assignment, and invokes an application assigned the home key, etc. An authentication state control module 62 is a module that provides a user authentication function of the image forming apparatus 10. A Web API screen setting module 64 is a module that provides a function of remote home key assignment.

The system information storage unit 44 stores the overall system setting of the image forming apparatus 10. The system information storage unit 44 includes a login user information storage unit 70 for storing information set by the SDK module 42 and a home screen information storage unit 72.

<Details of Processes>

«Home Key Assignment»

Figure 5:
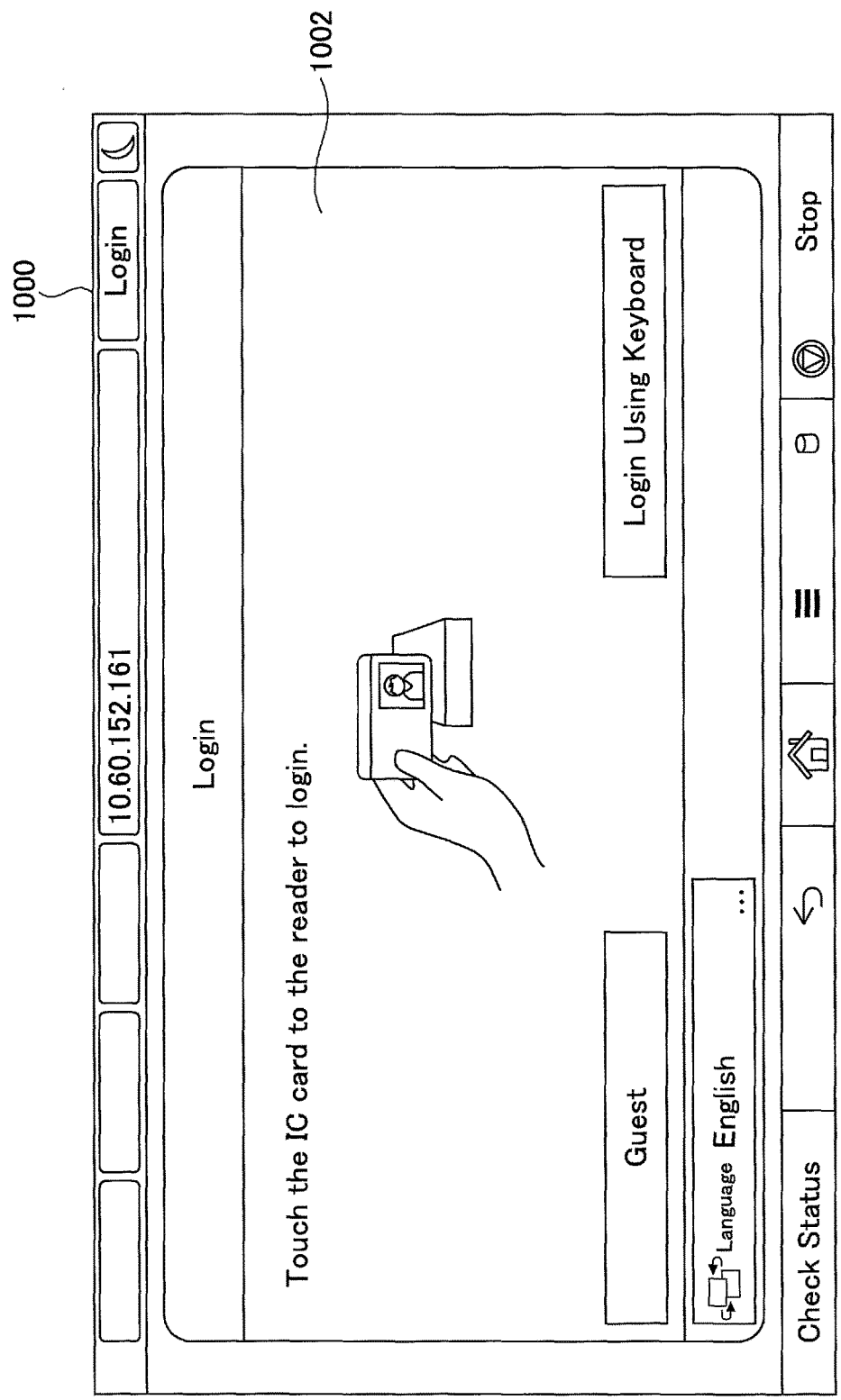
FIG. 5 is an image diagram of an example of an operation screen in the logout state according to an embodiment of the present invention.

First, the home key assignment of the image forming apparatus 10 according to the present embodiment will be described. When the user authentication function of the image forming apparatus 10 is turned on, an operation screen 1000 in the logout state is displayed, as illustrated in FIG. 5, for example. FIG. 5 is an image diagram of an example of the operation screen in the logout state.

In the operation screen 1000 of FIG. 5, a login screen 1002 is displayed as an authentication dialog, and the operation screen 1000 is in an inoperable state until the authentication is successful. At that time, if the home key assignment is not made, a standard system home screen 1004 of FIG. 6 is hidden behind the login screen 1002.

Figure 6:
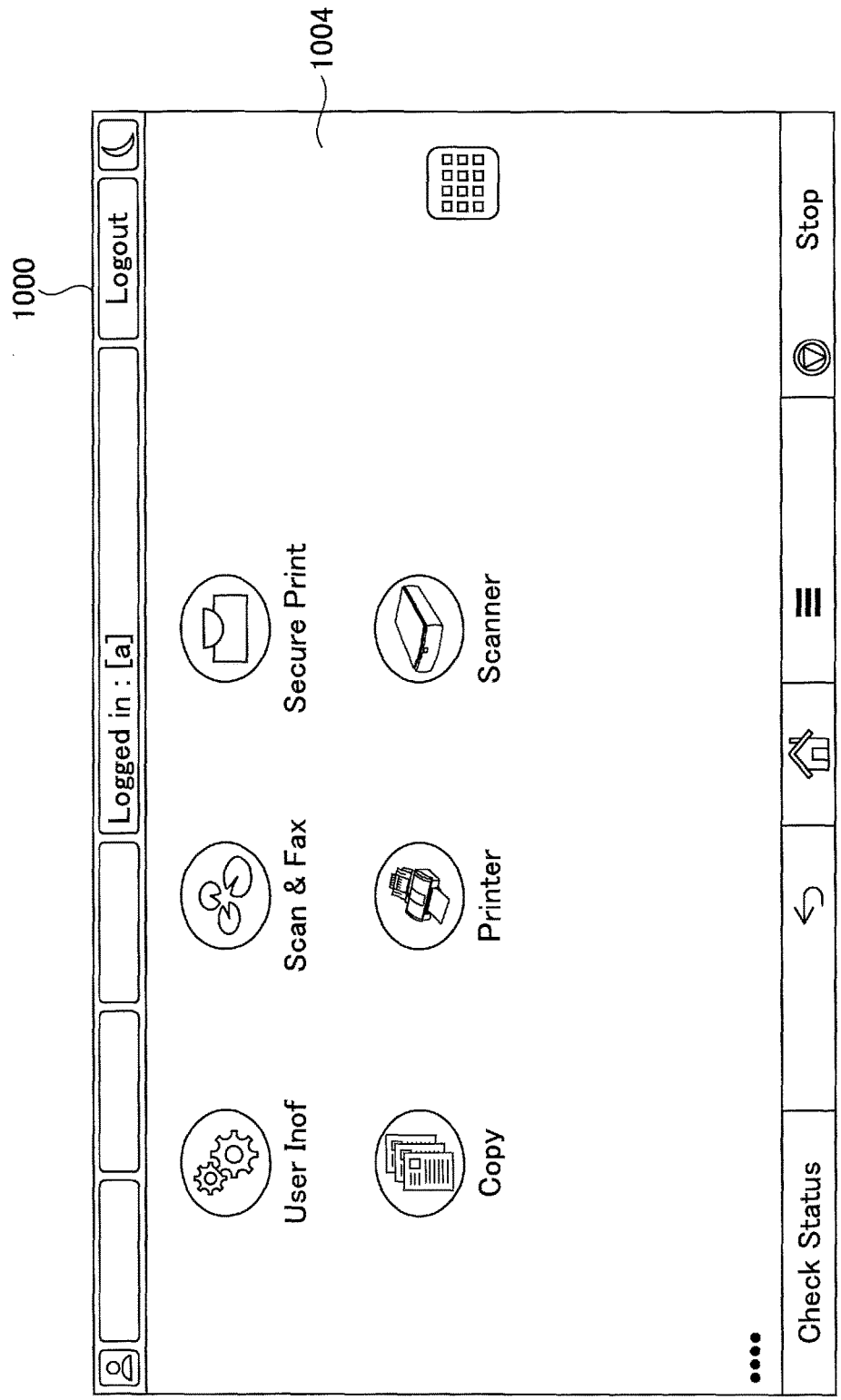
FIG. 6 is an image diagram of an example of an operation screen in the login state in which a system home screen is displayed, according to an embodiment of the present invention.

FIG. 6 is an image diagram of an example of the operation screen in the login state in which the system home screen is displayed. On the operation screen 1000, an icon for accepting an instruction form the user is displayed. When the user logs in, the operation screen 1000 transitions from the state of FIG. 5 to state of FIG. 6. In the operation screen 1000 of FIG. 6, the system home screen 1004 is displayed by deleting the login screen 1002, and the standard system home screen 1004 is in an operable state.

Figure 7:
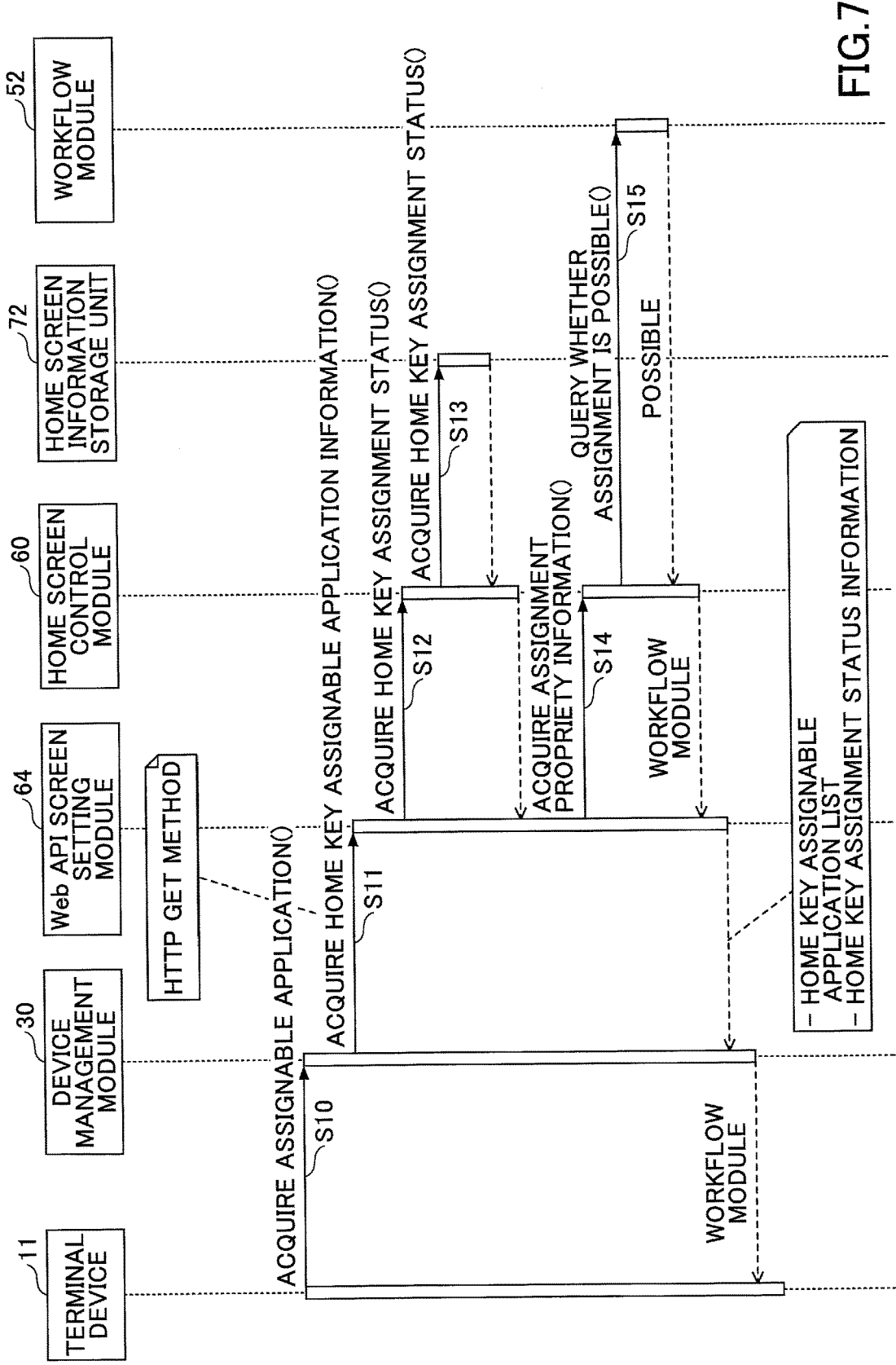
FIG. 7 is a sequence diagram of an example of the process of displaying a home key assignment setting screen according to an embodiment of the present invention.
Figure 10:
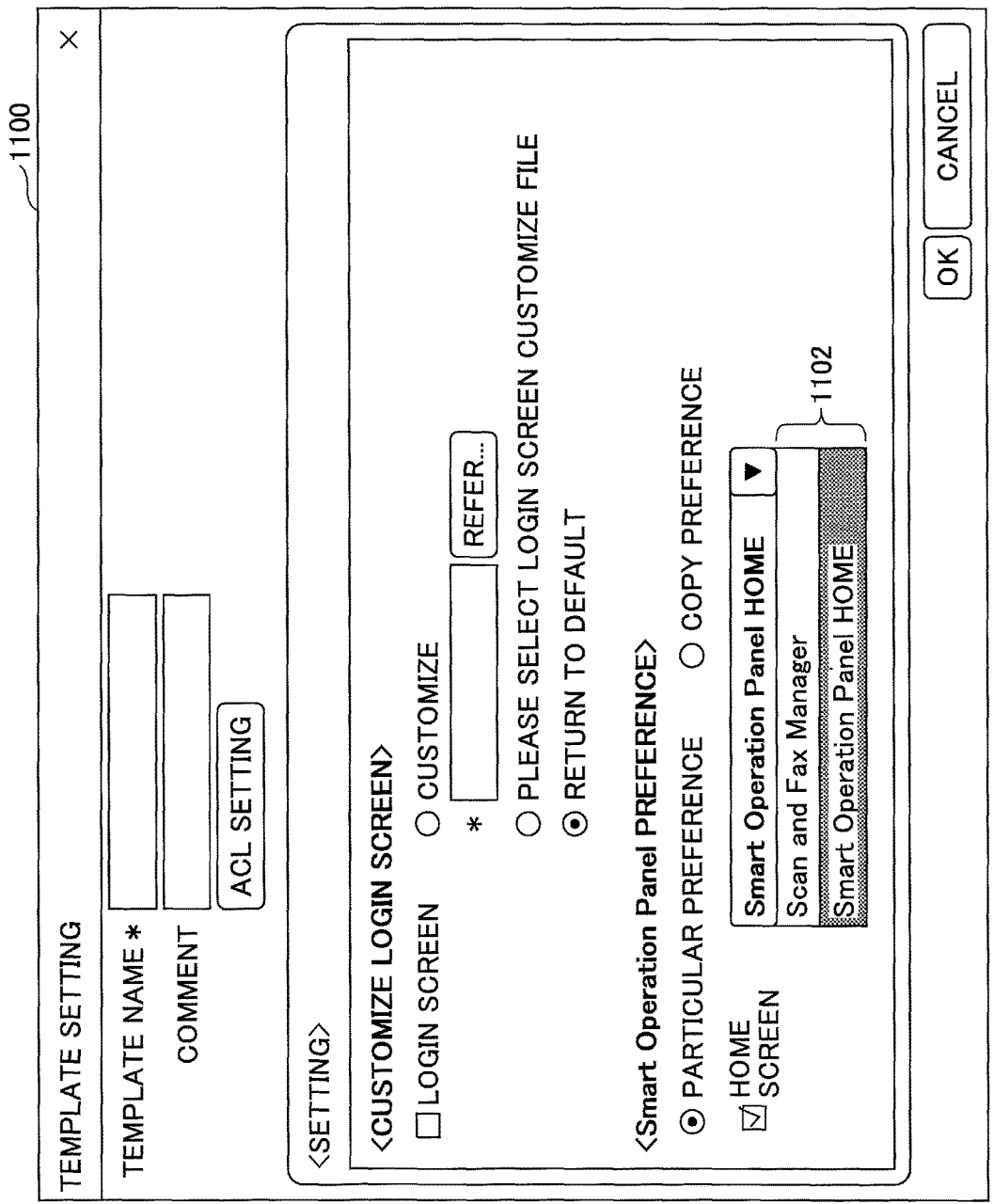
FIG. 10 is an image diagram of an example of a home key assignment setting screen according to an embodiment of the present invention.

To perform the home key assignment, for example, the user, who is operating the terminal device 11, accesses the device management server 14, and displays a home key assignment setting screen 1100 of FIG. 10. FIG. 7 is a sequence diagram of an example of the process of displaying the home key assignment setting screen.

When the user operates the terminal device 11, the terminal device 11 accesses the device management server 14. Upon receiving a request to display the home key assignment setting screen 1100, the terminal device 11 proceeds to step S10, and requests the device management module 30 of the device management server 14 to acquire an assignable application. Upon being requested to acquire the assignable application, the device management module 30 proceeds to step S11, and requests the Web API screen setting module 64 of the operation part 20 to acquire application information (an application list) indicating applications that can be assigned to the home key.

Proceeding to step S12, the Web API screen setting module 64 requests the home screen control module 60 to acquire the current home key assignment status. In step S13, the home screen control module 60 acquires the current home key assignment status from the home screen information storage unit 72, and returns the current home key assignment status to the Web API screen setting module 64.

Furthermore, in step S14, the Web API screen setting module 64 requests the home screen control module 60 to acquire the assignment propriety information. In step S15, the home screen control module 60 queries the installed workflow module 52 as to whether the assignment is possible, and returns the result to the web API screen setting module 64.

The Web API screen setting module 64 returns the home key assignable application list and the home key assignment status to the device management module 30. The device management module 30 causes the terminal device 11 to display the home key assignment setting screen 1100 as illustrated in FIG. 10.

FIG. 10 is an image diagram of an example of the home key assignment setting screen 1100. Home key assignable applications 1102 displayed on the home key assignment setting screen 1100 correspond to the home key assignable application list. The user can select a name of an assignment application to be assigned to a home key, from the home key assignment setting screen 1100 in FIG. 10, and press the OK button, to start the process of the home key assignment (setting of the home screen).

Note that in step S15, the workflow module 52 sets home key assignment propriety for the workflow module 52 itself as illustrated in FIG. 9, for example, in an application definition file such as "AndroidManifest.xml" of Android (registered trademark). FIG. 9 is a diagram for describing a setting method of a home key assignable application. In the example of FIG. 9, a setting for declaring that the workflow module 52 itself is assignable to a home key, is described in a definition file of a home key assignable application.

Figure 8:
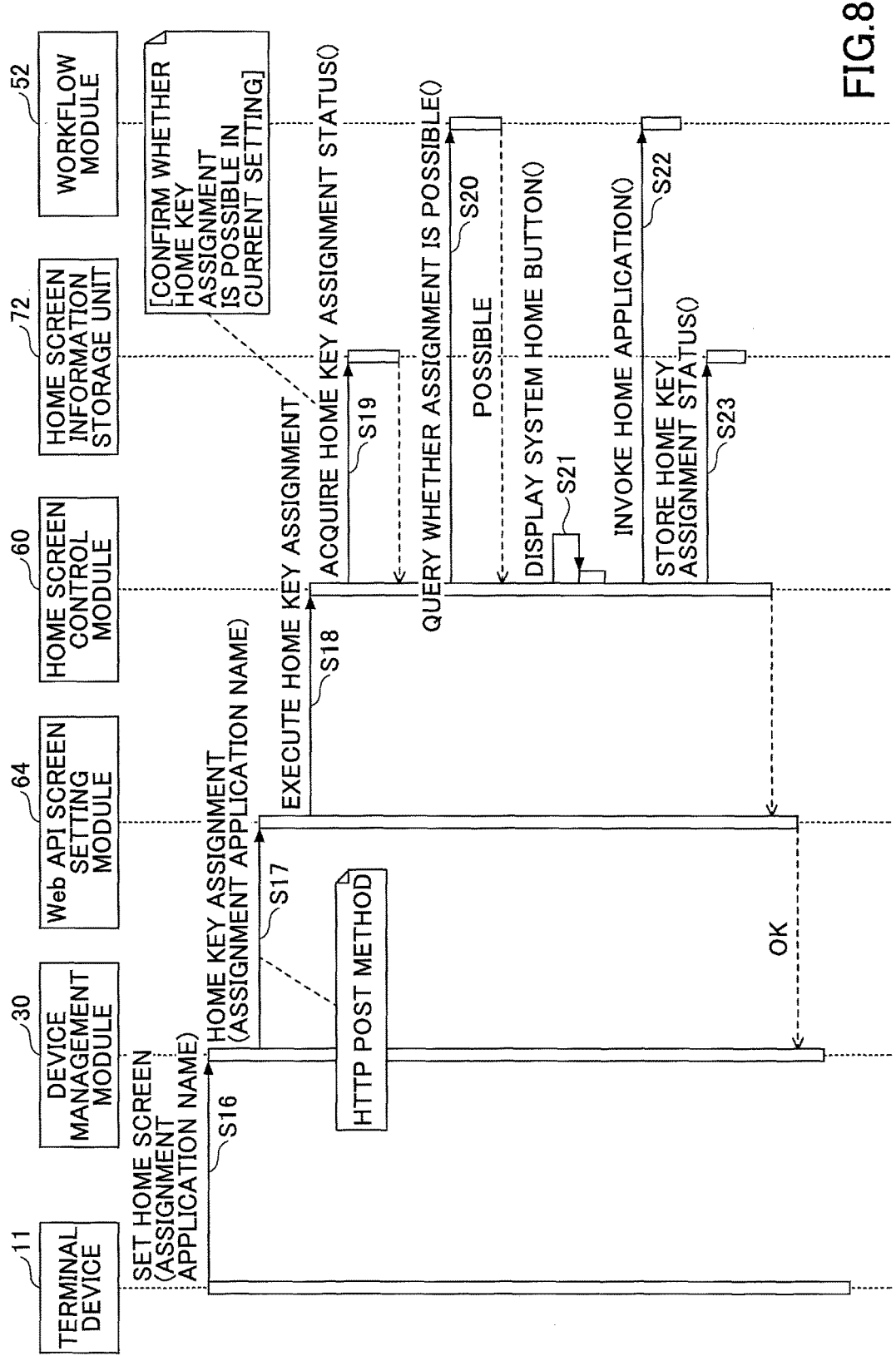
FIG. 8 is a sequence diagram of an example of a home key assignment process according to an embodiment of the present invention.

FIG. 8 is a sequence diagram of an example of the home key assignment process. In step S16, the device management module 30 is requested, from the terminal device 11, to perform a process of setting a home screen, and starts the home key assignment process. Upon receiving the request to set the home screen, the device management module 30 proceeds to step S17 and requests the Web API screen setting module 64 of the operation part 20 to perform the home key assignment.

Proceeding to step S18, and the Web API screen setting module 64 requests the home screen control module 60 to execute the home key assignment. In step S19, the home screen control module 60 acquires the current home key assignment status from the home screen information storage unit 72. The home screen control module 60 confirms whether the home key assignment is possible in the current setting, from the current home key assignment status. Furthermore, in step S20, the home screen control module 60 queries the installed workflow module 52 as to whether the assignment is possible, and acquires the result. The home screen control module 60 determines whether the application for which the execution of the home key assignment is requested ("assignment requested application"), is included in the acquired home key assignable application list.

The sequence diagram of FIG. 8 indicates an example in which the assignment requested application is included in the home key assignable application list. The home screen control module 60 determines that the home key assignment is successful. Since the home key assignment has been successful, in step S21, the home screen control module 60 displays a system home button 1006 as illustrated in the operation screen 1000 of FIG. 12.

Figure 12:
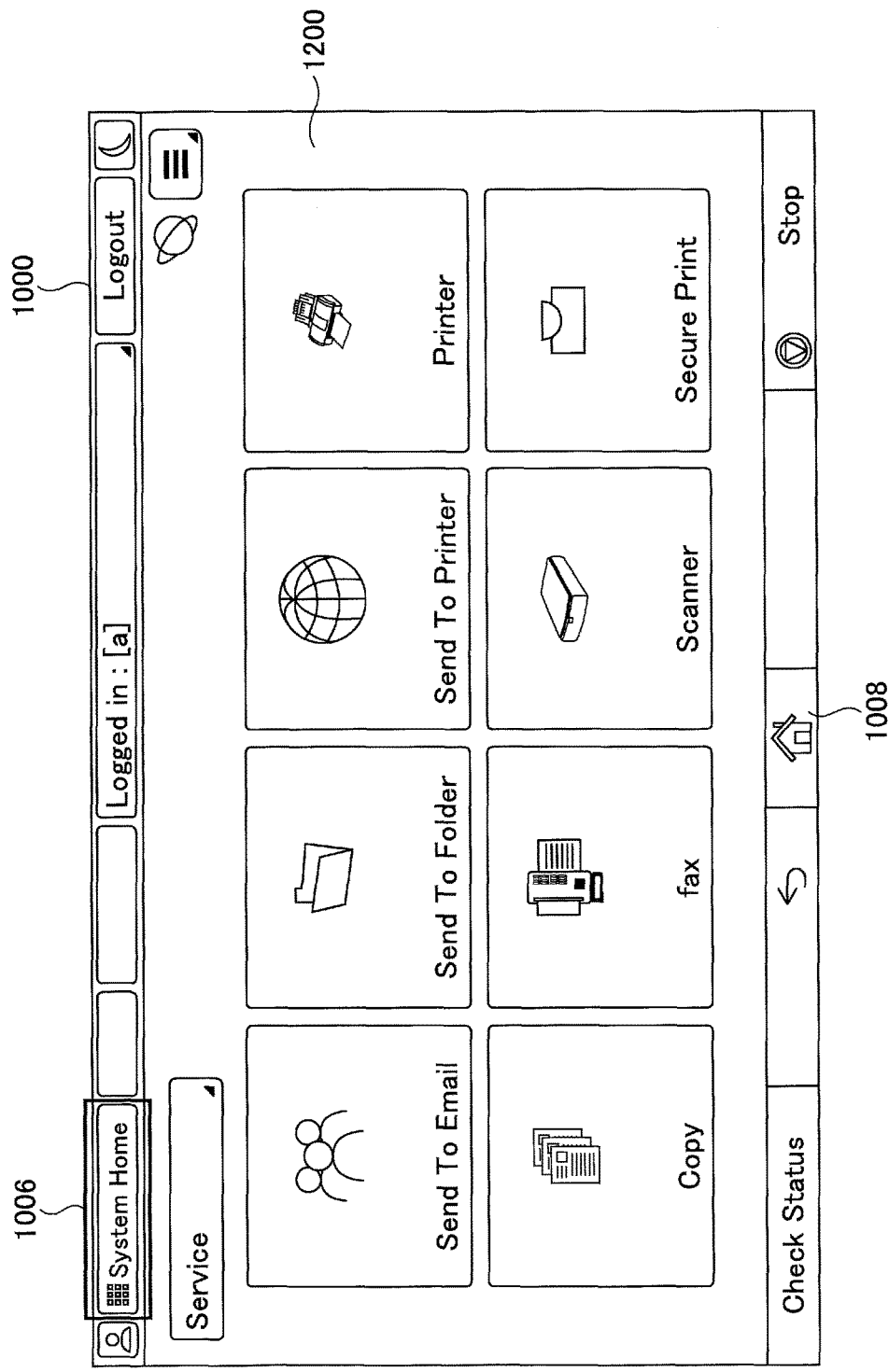
FIG. 12 is an image diagram of an example of an operation screen in a login state, in which the home key assignment has been done, according to an embodiment of the present invention.

FIG. 12 is an image diagram of an example of the operation screen in a login state, in which the home key assignment has been done. The system home button 1006 is a button for transitioning to the standard system home screen 1004 illustrated in FIG. 6. In step S22, the home screen control module 60 invokes the screen (application home screen 1200) of the workflow module 52 that is the assignment requested application. In step S23, the home screen control module 60 stores the current home key assignment status in the home screen information storage unit 72.

Figure 11:
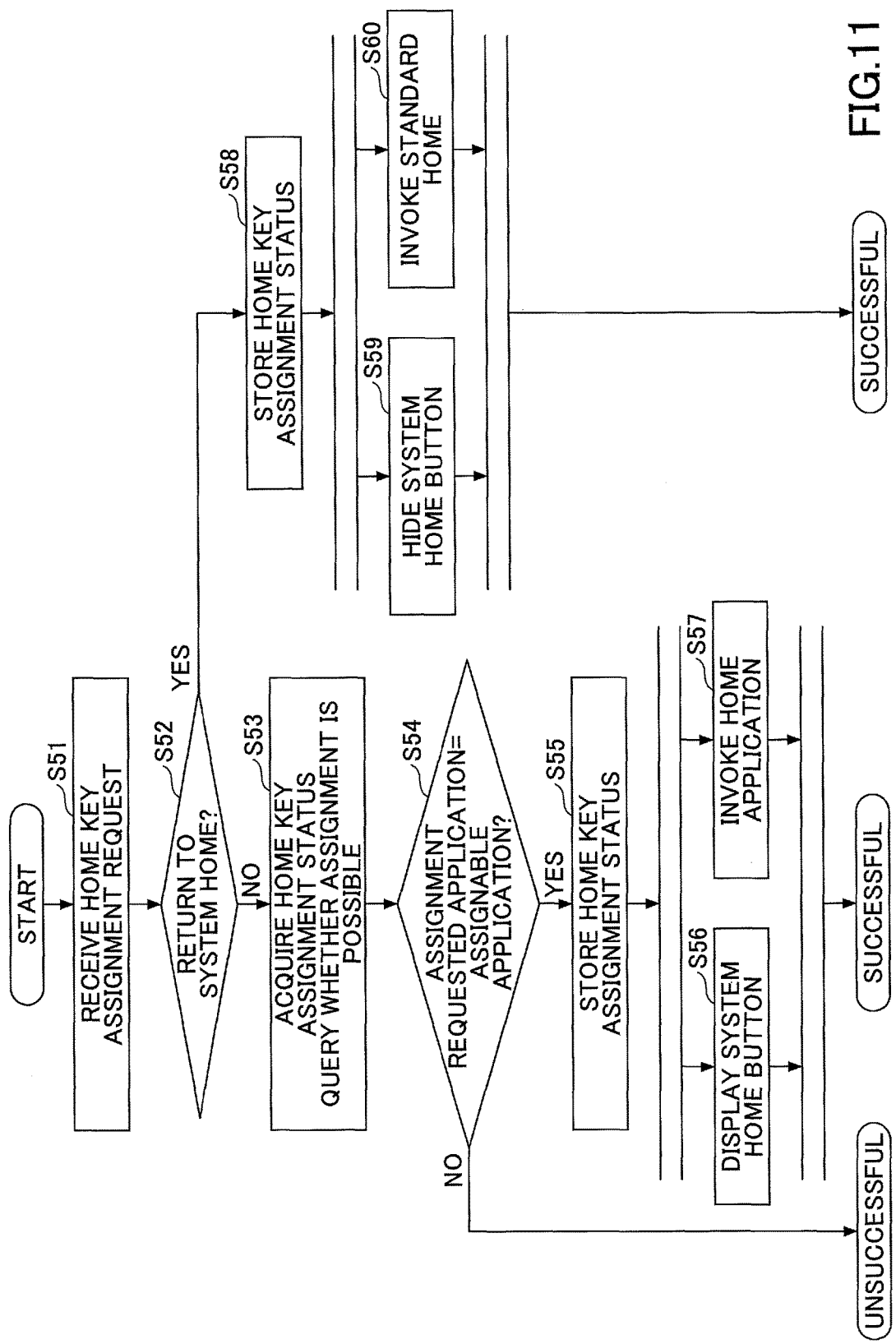
FIG. 11 is a flowchart of an example of home key assignment execution according to an embodiment of the present invention.

FIG. 11 is a flowchart of an example of home key assignment execution. The process of FIG. 11 corresponds to the process of the home screen control module 60 indicated in steps S18 to S23 of FIG. 8.

In step S51, the home screen control module 60 receives a request for home key assignment from the Web API screen setting module 64. In step S52, the home screen control module 60 determines whether the received request for home key assignment is a request to return to the standard system home screen 1004.

If the request is not a request to return to the standard system home screen 1004, the home screen control module 60 proceeds to step S53, acquires the current home key assignment status from the home screen information storage unit 72, and confirms whether the home key assignment is possible in the current setting. Furthermore, the home screen control module 60 queries the installed workflow module 52 as to whether the assignment is possible, and acquires the result as a home key assignable application. In step S54, the home screen control module 60 determines whether the assignment requested application is included in the home key assignable application list.

If the assignment requested application is not included in the home key assignable application list, the home screen control module 60 determines that the home key assignment has been unsuccessful. If the assignment requested application is included in the home key assignable application list, in step S55, the home screen control module 60 stores the assignment of the assignment requested application as the current home key assignment status, in the home screen information storage unit 72.

Then, in step S56, the home screen control module 60 displays the system home button 1006 as illustrated in the operation screen 1000 of FIG. 12. In step S57, the home screen control module 60 invokes the screen (application home screen 1200) of the workflow module 52 that is the assignment requested application.

If it is determined in step S52 that the request is for returning to the standard system home screen 1004, the home screen control module 60 proceeds to step S58 and stores the assignment of the standard system home screen 1004 as the current home key assignment status, in the home screen information storage unit 72.

Then, in step S59, the home screen control module 60 hides the system home button 1006 as illustrated in the operation screen 1000 of FIG. 6. In step S60, the home screen control module 60 invokes the standard system home screen 1004.

Figure 13:
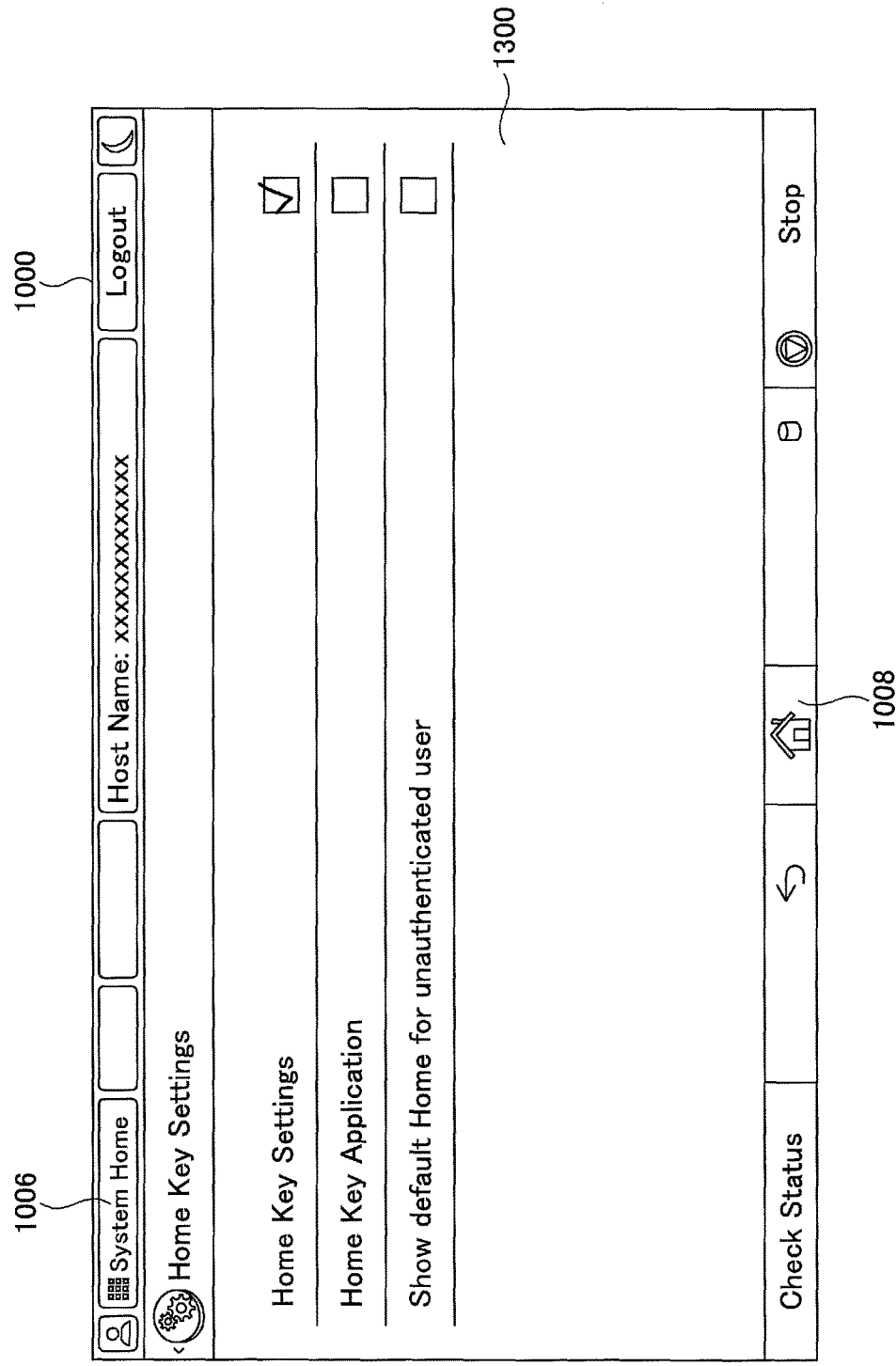
FIG. 13 is an image diagram of an example of a home key assignment setting screen displayed on an operation part according to an embodiment of the present invention.

Note that the display of the system home button 1006 on the operation screen 1000 in FIG. 12 is not essential, and it is also possible not to display the system home button 1006 when it is not desired to transition to a screen other than the screen provided by the assignment requested application. Furthermore, the home key assignment setting screen 1100 in FIG. 10 can be displayed on the operation part 20 of the image forming apparatus 10 as illustrated in FIG. 13, for example. FIG. 13 is an image diagram of an example of a home key assignment setting screen displayed on the operation part 20. The user can also start the process of home key assignment (setting of the home screen) from a home key assignment setting screen 1300 displayed on the operation screen 1000 of FIG. 13.

«Control of Home Screen at Login/logout»

Figure 14:
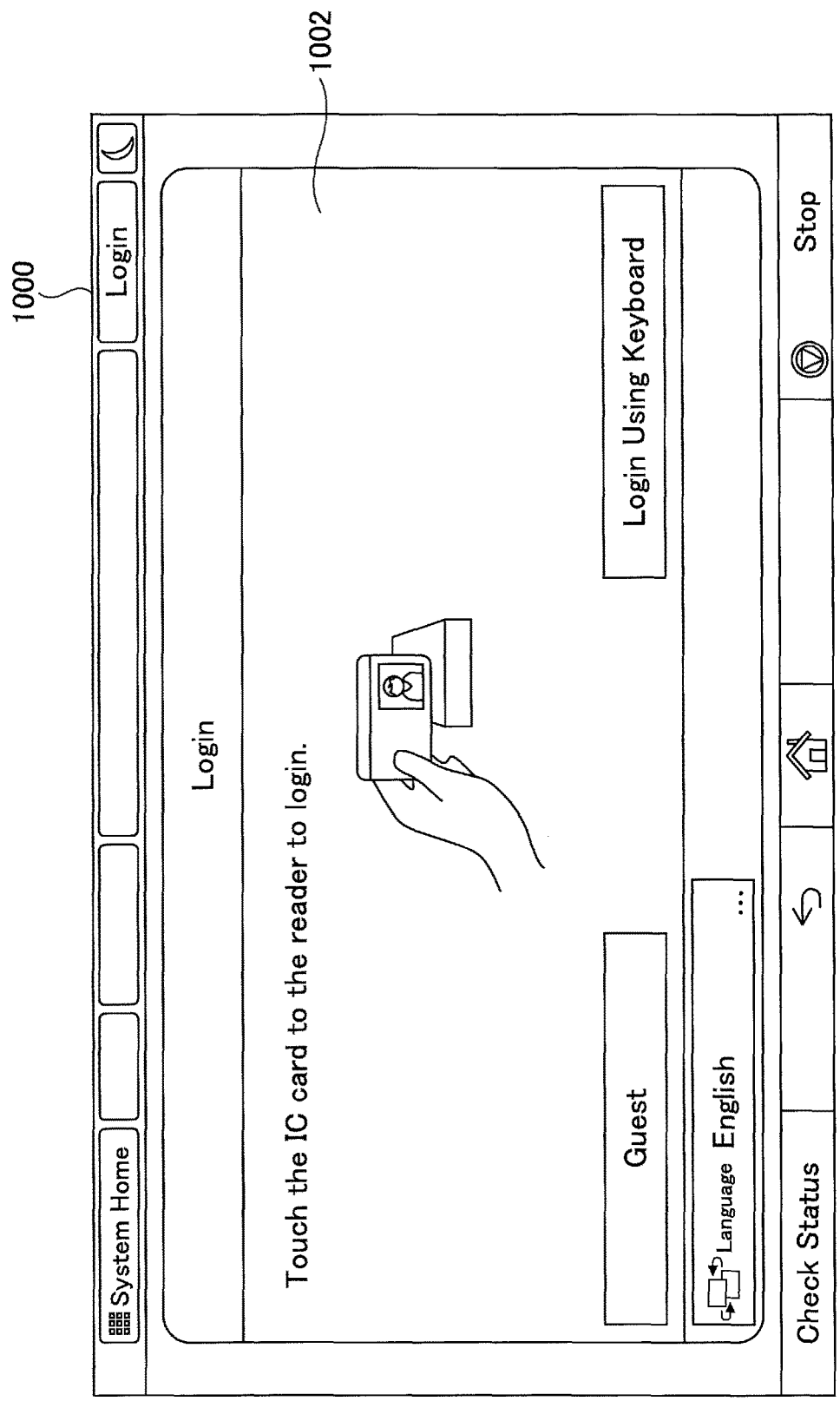
FIG. 14 is an image diagram of an example of an operation screen in the logout state, in which the home key assignment has been done, according to an embodiment of the present invention.

FIG. 14 is an image diagram of an example of the operation screen in the logout state in which the home key assignment has been done. In the operation screen 1000 of FIG. 14, the login screen 1002 is displayed as an authentication dialog, and the operation screen 1000 is in an inoperable state until the authentication is successful. At this time, if the home key assignment has been done, the application home screen 1200 of FIG. 12 is hidden behind the login screen 1002.

Figure 15:
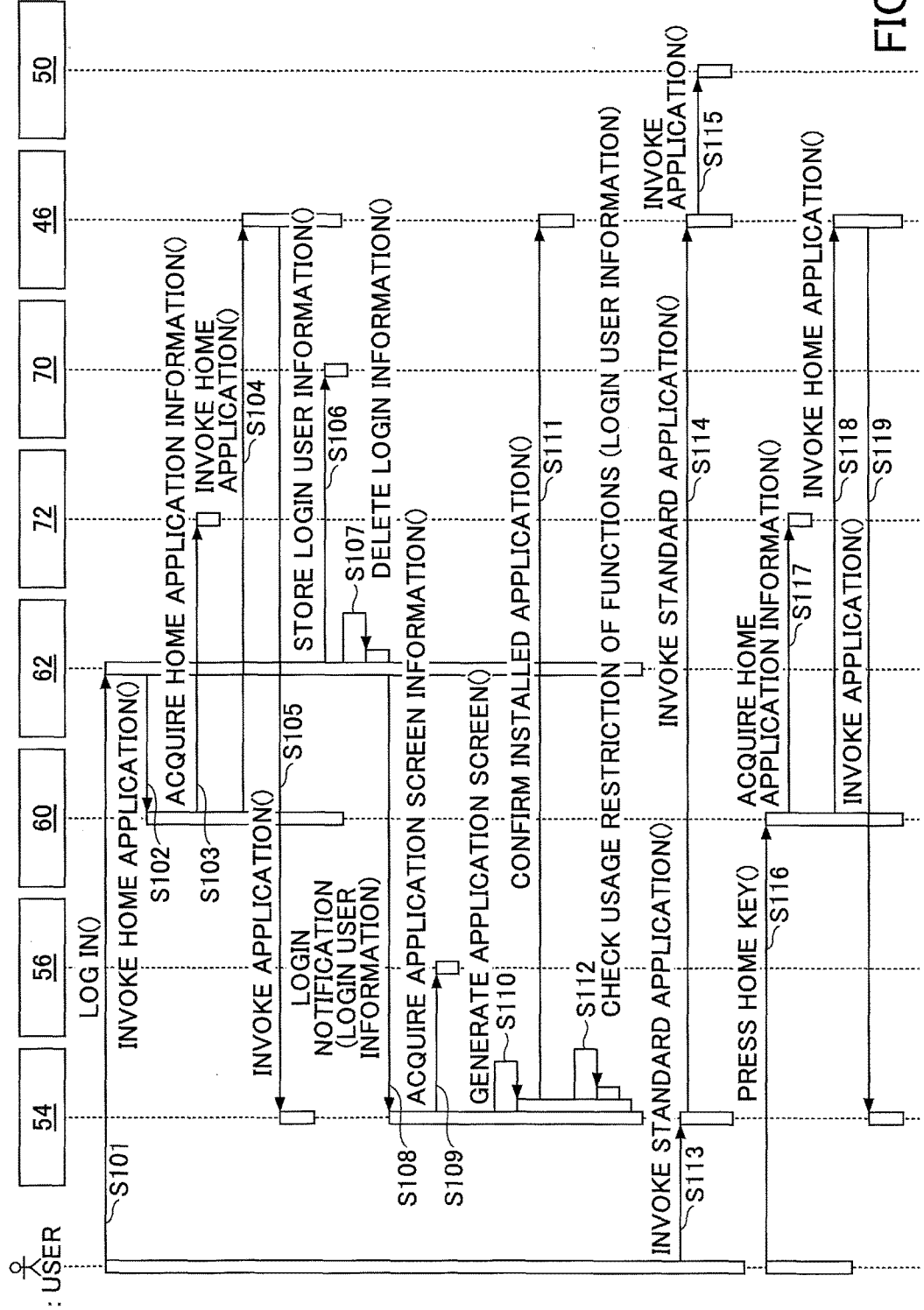
FIG. 15 is a sequence diagram of an example of home screen control at the time of login according to an embodiment of the present invention.

When the user authentication function is turned on, control of the home screen at the time of login is performed as illustrated in FIG. 15, for example. FIG. 15 is a sequence diagram of an example of home screen control at the time of login.

In step S101, the authentication state control module 62 of the operation part 20 accepts execution of login by the user. Here, the description will be continued on the assumption that the login has succeeded. The authentication state control module 62 proceeds to step S102 and requests the home screen control module 60 to invoke the home application.

In step S103, the home screen control module 60 acquires the home application information from the home screen information storage unit 72. Based on the acquired home application information, the home screen control module 60 confirms whether there is the workflow module 52 assigned to the home key.

If there is the workflow module 52 assigned to the home key, the home screen control module 60 proceeds to step S104 and requests the OS 46 to invoke the home application. Proceeding to step S105, the OS 46 invokes the application from the screen control unit 54 of the workflow module 52 assigned to the home key.

In step S106, the authentication state control module 62 stores the login user information in the login user information storage unit 70. Furthermore, the authentication state control module 62 proceeds to step S107 and deletes the login screen 1002. Proceeding to step S108, the authentication state control module 62 specifies the login user information and gives a login notification to the screen control unit 54 of the workflow module 52 assigned to the home key.

Proceeding to step S109, the screen control unit 54 acquires the application screen information from the workflow information storage unit 56. In step S110, the screen control unit 54 generates and displays the application home screen 1200 specific to the login user, based on the acquired login user information and application screen information. Since the technique for displaying a screen customized for each user is an existing technique, a description thereof will be omitted.

For example, in step S111, the screen control unit 54 requests the OS 46 to confirm the installed application. In step S112, the screen control unit 54 checks the usage restriction of functions of the login user, and displays, on the application home screen 1200, the button of the function that the login user can use in a selectable manner.

In step S113, the user requests to invoke the standard application 50 from the application home screen 1200. Proceeding to step S114, the screen control unit 54 of the workflow module 52 assigned to the home key, requests the OS 46 to invoke the standard application 50. In step S115, the OS 46 reads out the standard application 50 and displays the screen of the standard application 50.

When a home key 1008 on the operation screen 1000 is pressed by the user in step S116, the home screen control module 60 proceeds to step S117 and acquires home application information from the home screen information storage unit 72.

The home screen control module 60 proceeds to step S118 and requests the OS 46 to invoke the home application. Proceeding to step S119, the OS 46 invokes the application from the screen control unit 54 of the workflow module 52 assigned to the home key.

Figure 16:
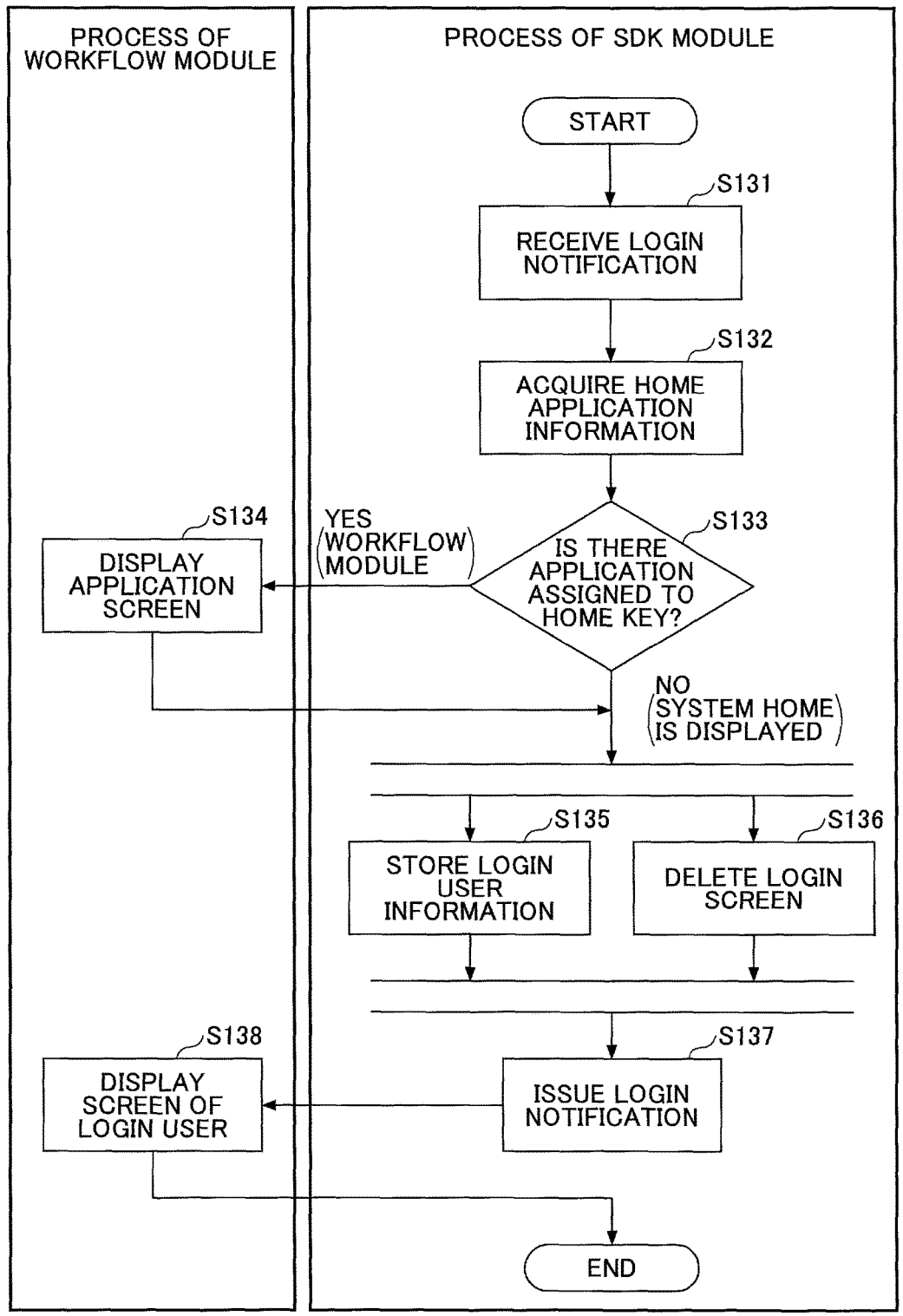
FIG. 16 is a flowchart of an example of home screen control at the time of login according to an embodiment of the present invention.

FIG. 16 is a flowchart of an example of home screen control at the time of login. The process of FIG. 16 corresponds to the process of the workflow module 52 and the process of the SDK module 42 indicated in steps S102 to S112 of FIG. 15. In step S131, the authentication state control module 62 of the operation part 20 receives the login notification by the user.

In step S132, the home screen control module 60 acquires the home application information from the home screen information storage unit 72. In step S133, the home screen control module 60 determines whether the workflow module 52 has been assigned to a home key, based on the acquired home application information.

If there is the workflow module 52 assigned to the home key, the home screen control module 60 causes the screen control unit 54 of the workflow module 52 assigned to the home key, to display the application screen. Note that if there is no workflow module 52 assigned to the home key, the home screen control module 60 leaves the system home screen 1004 displayed, by skipping step S134.

Proceeding to step S135, the authentication state control module 62 stores the login user information in the login user information storage unit 70. Furthermore, the authentication state control module 62 proceeds to step S136 and deletes the login screen 1002. Proceeding to step S137, the authentication state control module 62 specifies the login user information and gives the login notification to the screen control unit 54 of the workflow module 52 assigned to the home key.

Proceeding to step S138, and the screen control unit 54 acquires the application screen information from the workflow information storage unit 56. The screen control unit 54 generates and displays the application home screen 1200 unique to the login user based on the acquired login user information and application screen information.

Figure 17:
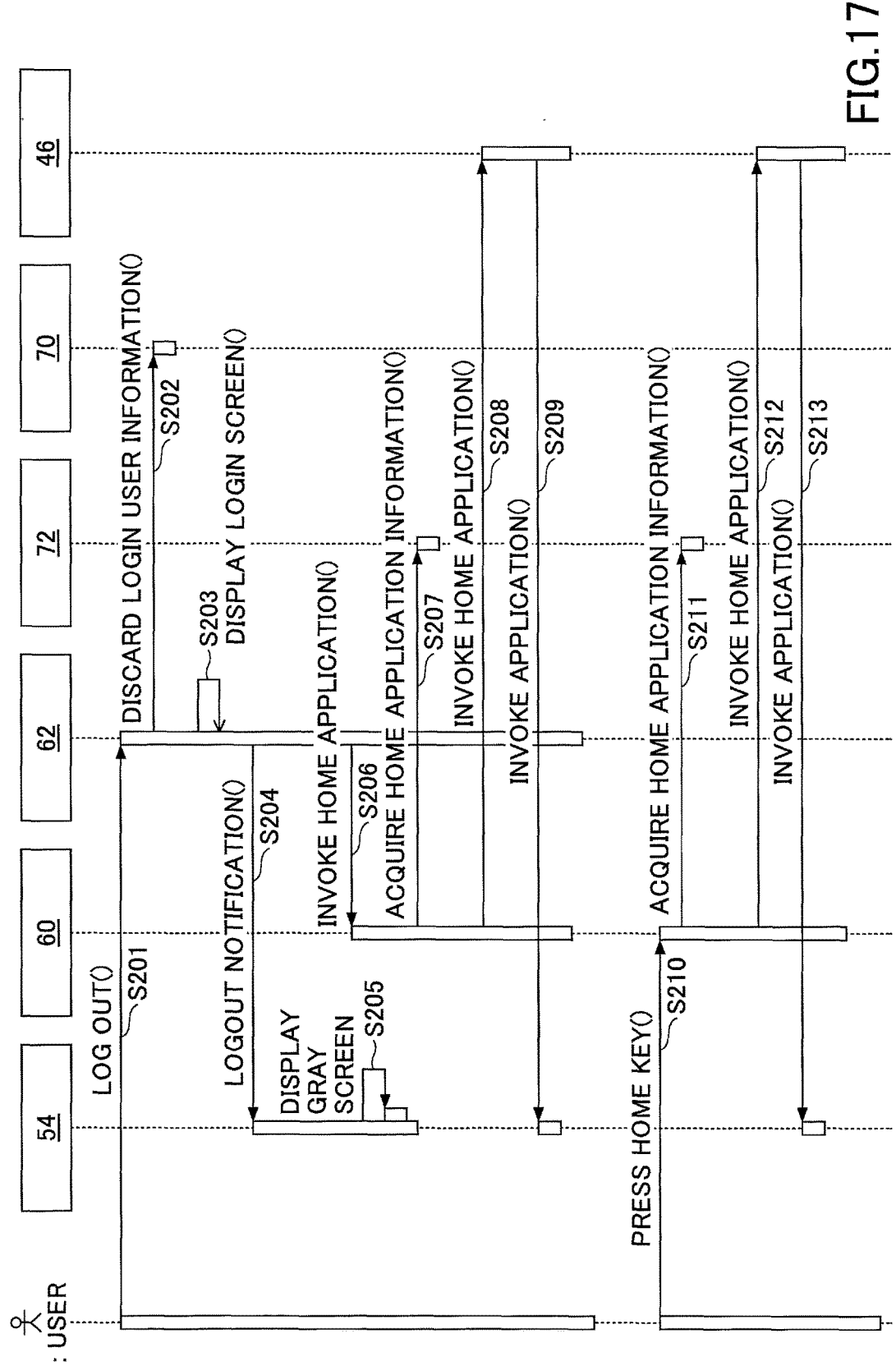
FIG. 17 is a sequence diagram of an example of home screen control at the time of logout according to an embodiment of the present invention.

Furthermore, control of the home screen at the time of logout is performed as illustrated in FIG. 17, for example. FIG. 17 is a sequence diagram of an example of home screen control at the time of logout.

In step S201, the authentication state control module 62 of the operation part 20 accepts execution of logout by the user. Proceeding to step S202, the authentication state control module 62 discards the login user information from the login user information storage unit 70. Furthermore, the authentication state control module 62 proceeds to step S203 to display the login screen 1002.

Proceeding to step S204, the authentication state control module 62 sends a logout notification to the screen control unit 54 of the workflow module 52 assigned to the home key, if there is the workflow module 52 assigned to the home key. Upon receiving the logout notification, the screen control unit 54 proceeds to step S205 and displays a screen (gray screen) from which the application home screen 1200 unique to the login user has been discarded.

After the logout notification in step S204, the authentication state control module 62 proceeds to step S206. The authentication state control module 62 requests the home screen control module 60 to invoke the home application.

Proceeding to step S207, the home screen control module 60 acquires home application information from the home screen information storage unit 72. Based on the acquired home application information, the home screen control module 60 confirms whether there is the workflow module 52 assigned to the home key.

If there is the workflow module 52 assigned to the home key, the home screen control module 60 proceeds to step S208 and requests the OS 46 to invoke the home application behind the login screen 1002. In step S209, the OS 46 invokes the application from the screen control unit 54 of the workflow module 52 assigned to the home key.

By the processes so far, if there is the workflow module 52 assigned to the home key, the application home screen 1200 is displayed behind the login screen 1002, and if there is no workflow module 52 assigned to the home key, the system home screen 1004 is displayed behind the login screen 1002. Thereafter, the operation part 20 enters the logout state.

Note that it is possible to press the home key 1008 even in the logout state. When the home key 1008 on the operation screen 1000 is pressed by the user in step S210, the home screen control module 60 proceeds to step S211 and acquires the home application information from the home screen information storage unit 72.

The home screen control module 60 proceeds to step S212 and requests the OS 46 to invoke the home application. In step S213, the OS 46 invokes the application from the screen control unit 54 of the workflow module 52 assigned to the home key.

However, since the application home screen 1200 is displayed behind the login screen 1002, the application home screen 1200 is in a state where transition is not possible. Also, the screen control unit 54 that has received the logout notification is in a state of not being able to confirm the application home screen 1200, because a screen (for example, a gray screen), from which the application home screen 1200 unique to the login user has been discarded, is displayed. Furthermore, in the logout state, the system home button 1006 on the operation screen 1000 is set in a grayed-down state or a non-displayed state. In this way, the operation part 20 according to the present embodiment can be used after the application home screen 1200 unique to the user assigned to the home key 1008, has entered the login state. Furthermore, in the logout state, on the operation part 20 according to the present embodiment, the application home screen 1200 unique to the user cannot be used and is not visually recognizable.

Figure 18:
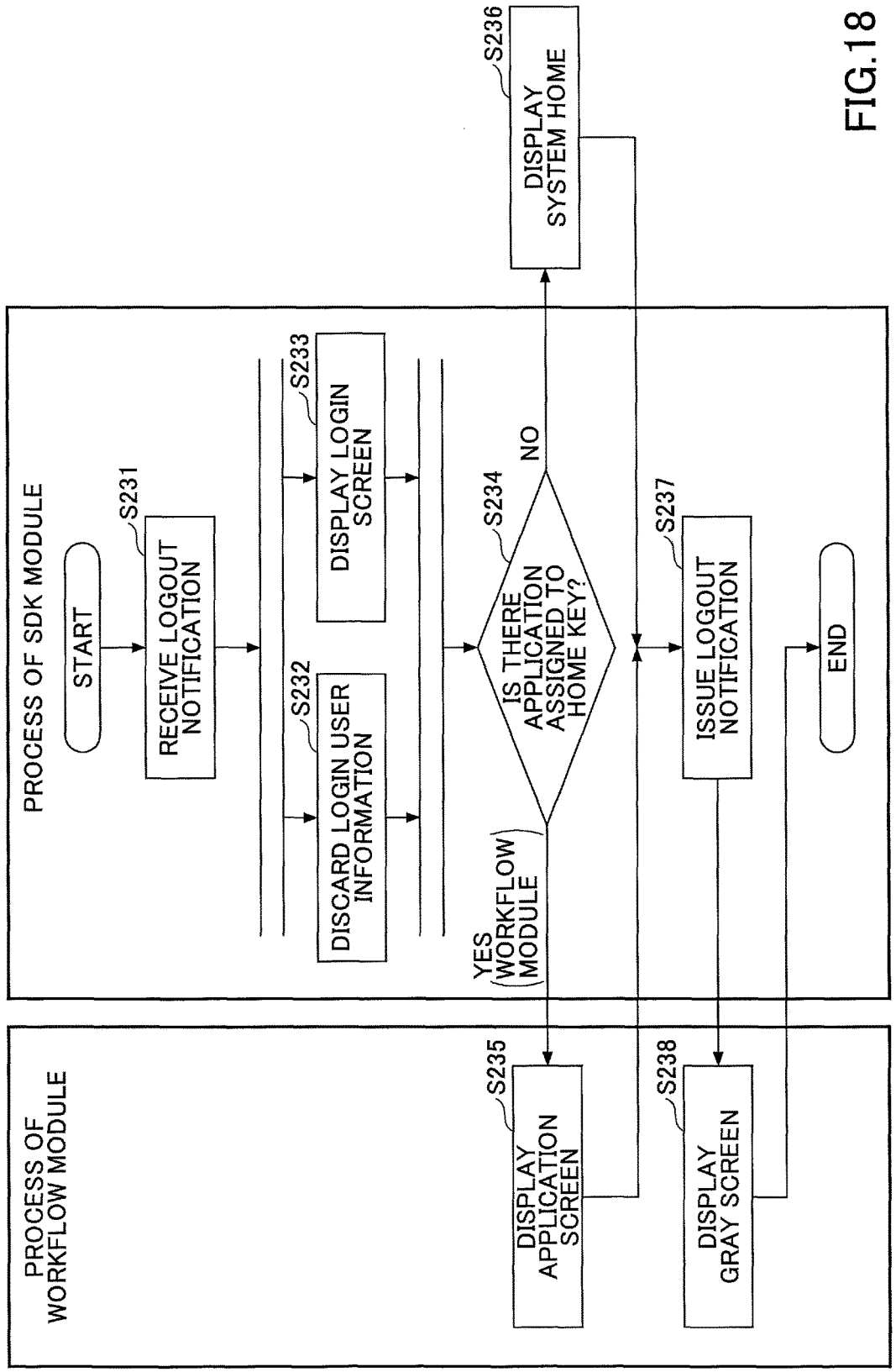
FIG. 18 is a flowchart of an example of home screen control at the time of logout according to an embodiment of the present invention.

FIG. 18 is a flowchart of an example of home screen control at the time of logout. The process of FIG. 18 corresponds to the process of the workflow module 52 and the process of the SDK module 42 indicated in steps S202 to S209 of FIG. 17. In step S231, the authentication state control module 62 of the operation part 20 receives a logout notification by the user.

Proceeding to step S232, the authentication state control module 62 discards the login user information from the login user information storage unit 70. Furthermore, the authentication state control module 62 proceeds to step S233 and displays the login screen 1002.

Proceeding to step S234, if the workflow module 52 assigned to the home key exists, the authentication state control module 62 proceeds to step S235, and generates the application home screen 1200 behind the login screen 1002. If there is no workflow module 52 assigned to the home key, in step S236, the authentication state control module 62 generates the system home screen 1004.

Proceeding to step S237, the authentication state control module 62 sends a logout notification to the screen control unit 54 of the workflow module 52 assigned to the home key, if there is the workflow module 52 assigned to the home key. Upon receiving the logout notification, the screen control unit 54 proceeds to step S238 and displays a screen (gray screen) from which the application home screen 1200 generated behind the login screen 1002 has been discarded.

As described above, the operation part 20 of the image forming apparatus 10 according to the present embodiment combines the workflow module installed in the operation part 20 and the user authentication function, so that a home screen customized for each user can be realized without a launcher application.

Figure 19:
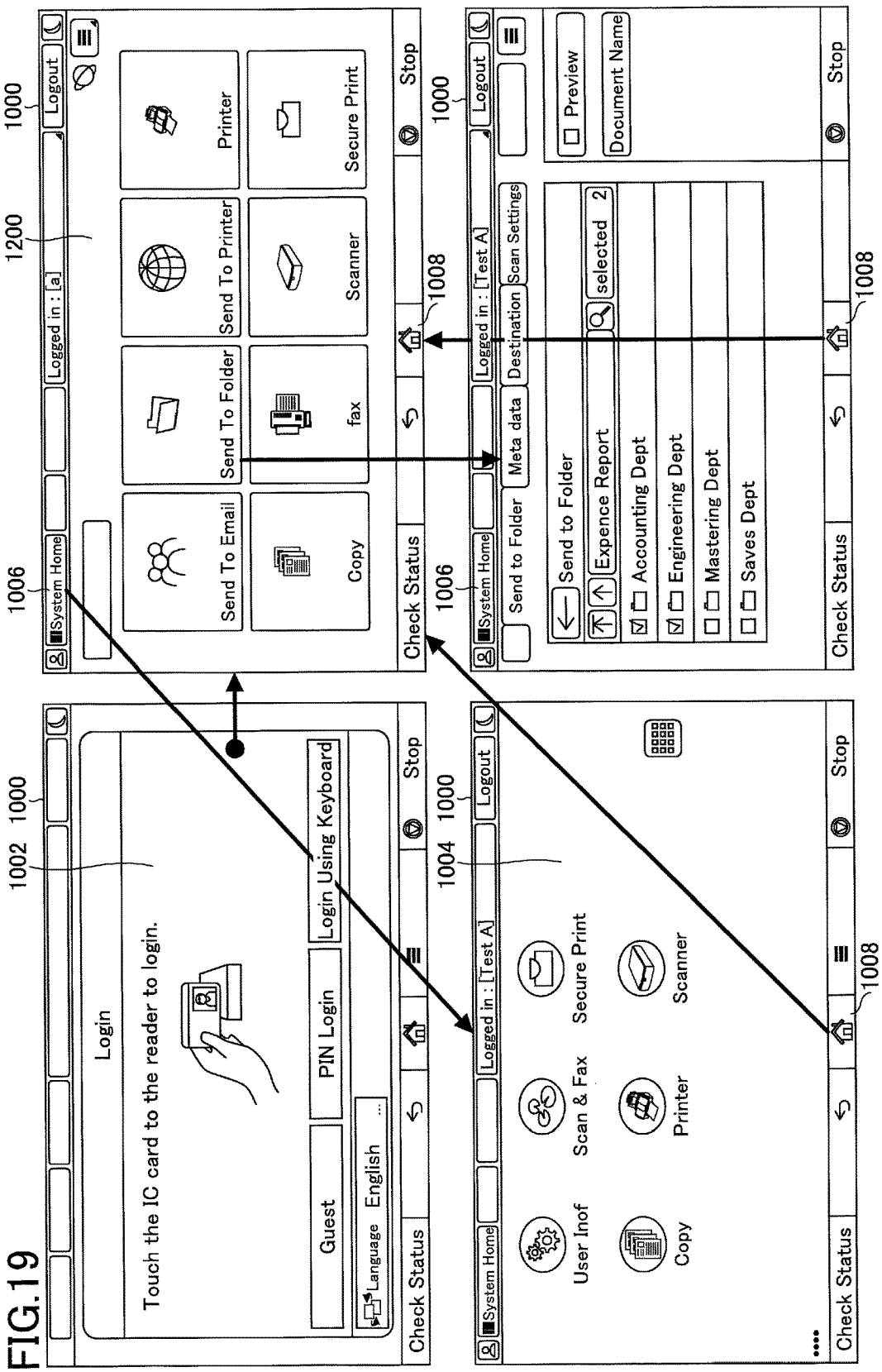
FIG. 19 is a screen transition diagram of an example of an operation screen displayed on the operation part according to an embodiment of the present invention.

FIG. 19 is a screen transition diagram of an example of an operation screen displayed on the operation part 20. As illustrated in the screen transition diagram of FIG. 19, on the operation screen 1000, after the login screen 1002 is deleted by logging in, the application home screen 1200 is displayed by pressing the home key 1008. By pressing the system home button 1006, the standard system home screen 1004 is displayed on the operation screen 1000. Furthermore, when the user requests the standard application 50 to be invoked from the application home screen 1200, the screen of the invoked standard application 50 is displayed on the operation screen 1000.

<Overview>

When the operation part 20 according to the present embodiment assigns an application to the home key 1008 on the operation screen 1000, by pressing the home key, a screen of the application assigned to the home key 1008 is displayed, instead of the standard system home screen 1004. According to the cooperation between the application assigned to the home key 1008 and the user authentication function, the operation part 20 can generate the application home screen 1200 unique to the login user and display the application home screen 1200 after the user logs in.

The present invention can be implemented by a technical expert having common general knowledge of the technical field of information processing, by an apparatus configured by connecting ASIC (Application Specific Integrated Circuits) and conventional circuit modules. The respective functions described in the embodiments can be implemented by one or more processing circuits. Note that a "processing circuit" in the present specification includes a processor programed to execute the respective functions by software, and hardware such as ASIC and circuit modules designed to execute the respective functions.

According to one embodiment of the present invention, an image forming apparatus capable of displaying, as a home screen, a screen created by an application other than a launcher application, can be provided.

The information processing terminal, the image forming apparatus, the information processing method, and the recording medium are not limited to the specific embodiments described in the detailed description, and variations and modifications may be made without departing from the spirit and scope of the present invention.

What is claimed is:

1. An information processing terminal configured to function as an operator of an image forming apparatus, the information processing terminal comprising:
    a display device configured to display a screen;
    a processor that is configured to:
    generate a system home screen for a system;
    generate an extended function screen for an extended function;
    set the screen to be displayed on the operator according to an operation performed with respect to a predetermined icon included in the screen displayed on the display device, the display screen setter having the system home screen set as an initial value;
    switch the screen set by the display screen setter;

determine the screen set by the display screen setter according to the operation performed with respect to the predetermined icon;

display, on the display device, the extended function screen together with an icon for displaying the system home screen, upon determining that the extended function screen is set by the display screen setter, and display a home key assignment setting screen including a home key assignable application list so as to accept, from a user, assignment of the extended function screen as a home screen to be displayed on the operator.

2. The information processing terminal according to claim 1, wherein the processor is further configured to:

generate an authentication screen for authenticating a user, and to display, on the operator, the authentication screen so as to hide the system home screen or the extended function screen that is displayed on the operator, until authentication of the user is determined to be successful.

3. The information processing terminal according to claim 1, wherein the information processing terminal includes a definition file including a setting as to whether the extended function screen can be assigned as a home screen to be displayed on the operator.

4. The image forming apparatus comprising:

the information processing terminal according to claim 1 functioning as the operator of the image forming apparatus; and a main body configured to implement one or more functions relating to image formation.

5. A non-transitory computer-readable recording medium storing a program that causes a computer to execute a process performed in an information processing terminal configured to function as an operator of an image forming apparatus, the process comprising:

displaying a screen on a display device of the information processing terminal;

generating a system home screen for a system;

generating an extended function screen for an extended function;

setting the screen to be displayed on the operator according to an operation performed with respect to a predetermined icon included in the screen displayed on the display device, wherein the system home screen is set as an initial value;

switching the screen set at the setting;

determining the screen set at the setting according to the operation performed with respect to the predetermined icon;

displaying, on the display device, the extended function screen together with an icon for displaying the system home screen, upon determining that the extended function screen is set at the setting, and displaying a home key assignment setting screen including a home key assignable application list so as to accept, from a user, assignment of the extended function screen as a home screen to be displayed on the operator.

6. The non-transitory computer-readable recording medium according to claim 5, the process further comprising:

generating an authentication screen for authenticating a user, and displaying, on the operator, the authentication screen so as to hide the system home screen or the extended function screen that is displayed on the operator, until authentication of the user is determined to be successful.

7. The non-transitory computer-readable recording medium according to claim 5, wherein the generating of the extended function screen includes making a setting, in a definition file, as to whether the extended function screen can be assigned as a home screen to be displayed on the operator.

8. An information processing method performed by an information processing terminal configured to function as an operator of an image forming apparatus, the information processing method comprising:

displaying a screen on a display device of the information processing terminal;

generating a system home screen for a system;

generating an extended function screen for an extended function;

setting the screen to be displayed on the operator according to an operation performed with respect to a predetermined icon included in the screen displayed on the display device, wherein the system home screen is set as an initial value;

switching the screen set at the setting;

determining the screen set at the setting according to the operation performed with respect to the predetermined icon;

displaying, on the display device, the extended function screen together with an icon for displaying the system home screen, upon determining that the extended function screen is set at the setting, and displaying a home key assignment setting screen including a home key assignable application list so as to accept, from a user, assignment of the extended function screen as a home screen to be displayed on the operator.

9. The information processing method according to claim 8, further comprising:

generating an authentication screen for authenticating a user, and displaying, on the operator, the authentication screen so as to hide the system home screen or the extended function screen that is displayed on the operator, until authentication of the user is determined to be successful.

10. The information processing method according to claim 8, wherein the generating of the extended function screen includes making a setting, in a definition file, as to whether the extended function screen can be assigned as a home screen to be displayed on the operator.

11. The information processing terminal according to claim 1, wherein the processor is further configured to determine whether the home key assignable application list includes an application for which the execution of a home key assignment is requested.

* * * * *

UNITED STATES PATENT AND TRADEMARK OFFICE
CERTIFICATE OF CORRECTION

PATENT NO. : 10,218,862 B2
APPLICATION NO. : 15/899744
DATED : February 26, 2019
INVENTOR(S) : Hisashi Naitoh It is certified that error appears in the above-identified patent and that said Letters Patent is hereby corrected as shown below:

On the Title Page

Please correct the Item (56): References Cited, FOREIGN PATENT DOCUMENTS, to "JP 2016-066281 4/2016" from "JP 2016-0666281 4/2016"

Signed and Sealed this
Fourteenth Day of May, 2019

Andrei Iancu
*Director of the United States Patent and Trademark Office*